United States Patent
Kim

(10) Patent No.: US 7,661,168 B2
(45) Date of Patent: Feb. 16, 2010

(54) WASHING MACHINE CONTROL METHOD

(75) Inventor: Young Soo Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 919 days.

(21) Appl. No.: 10/720,749

(22) Filed: Nov. 25, 2003

(65) Prior Publication Data
US 2004/0154645 A1  Aug. 12, 2004

(30) Foreign Application Priority Data
Nov. 28, 2002  (KR) .................. 10-2002-0074970

(51) Int. Cl.
*D06F 35/00* (2006.01)
(52) U.S. Cl. .............. 8/158; 8/159; 68/12.04; 68/12.05
(58) Field of Classification Search ............ 8/158, 8/159; 134/18; 68/12.04, 12.05
See application file for complete search history.

(56) References Cited

U.S. PATENT DOCUMENTS

| | | | | |
|---|---|---|---|---|
| 5,768,729 | A | * | 6/1998 | Cracraft ................ 8/158 |
| 6,634,191 | B1 | * | 10/2003 | Guler et al. .......... 68/12.04 |
| 6,842,929 | B2 | * | 1/2005 | Kim et al. .............. 8/159 |

FOREIGN PATENT DOCUMENTS

| | | | |
|---|---|---|---|
| KR | 99027766 A | * | 4/1999 |
| KR | 10-1999-0085003 A | | 12/1999 |
| KR | 10-2000-0050666 A | | 8/2000 |

* cited by examiner

*Primary Examiner*—Alexander Markoff
(74) *Attorney, Agent, or Firm*—McKenna Long & Aldridge LLP

(57) ABSTRACT

A washing machine control method reduces washing time and component stress from a repetitious re-supplying of water, due to absorption and evaporation after an initial supplying of water according to a selected wash course, by determining an optimum water re-supply amount according to a water level reduction rate. The method includes steps of proceeding a user-selected wash course for a predetermined time after supplying water to a washing machine according to a first water level set based on an amount of laundry in the washing machine; sensing a second water level corresponding to the predetermined time of the wash course; calculating a water level reduction rate based on the set first water level and the sensed second water level; determining an optimum water re-supply amount by comparing the calculated water level reduction rate to a predetermined value; re-supplying the water according to the first water level, if the calculated water level reduction rate is less than the predetermined value; re-supplying the water according to a third water level, greater than the first water level, if the calculated water level reduction rate is not less than the predetermined value; and completing the user-selected wash course after re-supplying water to the washing machine according to the optimum water re-supply amount. The sensing and calculating steps may each be repeated, say, three to four times, to obtain an average rate of water level reduction, so that the user-selected wash course may be reset based on the average rate of water level reduction.

9 Claims, 2 Drawing Sheets

WASHING MACHINE CONTROL METHOD

This application claims the benefit of Korean Application No. 10-2002-0074970 filed on Nov. 29, 2002, which is hereby incorporated by reference.

BACKGROUND OF THE INVENTION

1. Field of the Invention

The present invention relates to washing machines, and more particularly, to a washing machine control method in which a water level reduction rate is calculated to determine an optimum water re-supply amount.

2. Discussion of the Related Art

Generally speaking, to perform washing using a washing machine in which laundry has been placed, a wash course is selected to determine a wash pattern, water is supplied to the washing machine according a predetermined water level based on the amount of laundry in the washing machine, and washing is performed based on the predetermined water level. After the water reaches the predetermined level, however, the laundry absorbs a portion of the water, which soon lowers the water level. In addition, if the selected wash course calls for heating the water to a predetermined temperature before performing a washing step, the heating cycle evaporates a portion of the water, which also lowers the water level. Accordingly, as the washing step proceeds, there is a gradual reduction in the water level, and the rate of water level reduction depends on the type and amount of laundry and the selected wash course.

To compensate for the water level being lowered as above, a washing machine control method according to a related art introduces an additional supply of water before proceeding with the washing step, so that the predetermined water level is maintained. Such a method is illustrated in FIG. 1.

Referring to FIG. 1, the method of the related art includes steps of setting a water level based on an amount of laundry (S101), supplying water according to a predetermined water level (S102), performing washing according to a selected wash course (S103), determining whether the water level has fallen to a substantially lower level that necessitates the supply of additional water (S104), and stopping the washing step while re-supplying a predetermined amount of water based on the set water level (S105). To determine whether to re-supply an amount of water, the water is continuously monitored using a water level sensor, which senses a water pressure of the water in the washing machine.

In the above method, however, the rate of water level reduction will determine the number of times of re-supplying the predetermined amount of the water. That is, if the amount and type of laundry absorbs a great deal of water or absorbs the water slowly, or if the heating cycle results in a significant amount of evaporation, there will be an increased repetition of the steps to complete the water supply. Since the washing step is repeatedly interrupted, the time to perform the washing is excessive. Moreover, the various washing machine components for performing washing and water supplying are stressed by being repeatedly stopped and restarted, which reduces the life of the washing machine.

SUMMARY OF THE INVENTION

Accordingly, the present invention is directed to a washing machine control method that substantially obviates one or more of the problems due to limitations and disadvantages of the related art.

An object of the present invention, which has been devised to solve the foregoing problem, lies in providing a washing machine control method, which reduces the time required for the completion of a water supply operation according to a set water level.

It is another object of the present invention to provide a washing machine control method that reduces the stress on various components of the washing machine and increases the life of the washing machine accordingly.

It is another object of the present invention to provide a washing machine control method that enables the optimization of a wash course to achieve improved wash performance.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided a washing machine control method comprising steps of proceeding a user-selected wash course for a predetermined time after supplying water to a washing machine according to a first water level set based on an amount of laundry in the washing machine; sensing a second water level corresponding to the predetermined time of the wash course; calculating a water level reduction rate based on the set first water level and the sensed second water level; determining an optimum water re-supply amount by comparing the calculated water level reduction rate to a predetermined value; and completing the user-selected wash course after re-supplying water to the washing machine according to the optimum water re-supply amount. The method further comprises steps of re-supplying the water according to the first water level, if the calculated water level reduction rate is less than the predetermined value; and re-supplying the water according to a third water level, if the calculated water level reduction rate is not less than the predetermined value.

According to the above method of the present invention, each of the sensing and calculating steps are preferably repeated, to obtain an average rate of water level reduction and thereby enable a resetting of the user-selected wash course based on the average rate of water level reduction.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, examples of which are illustrated in the accompanying drawings.

Figure 1:
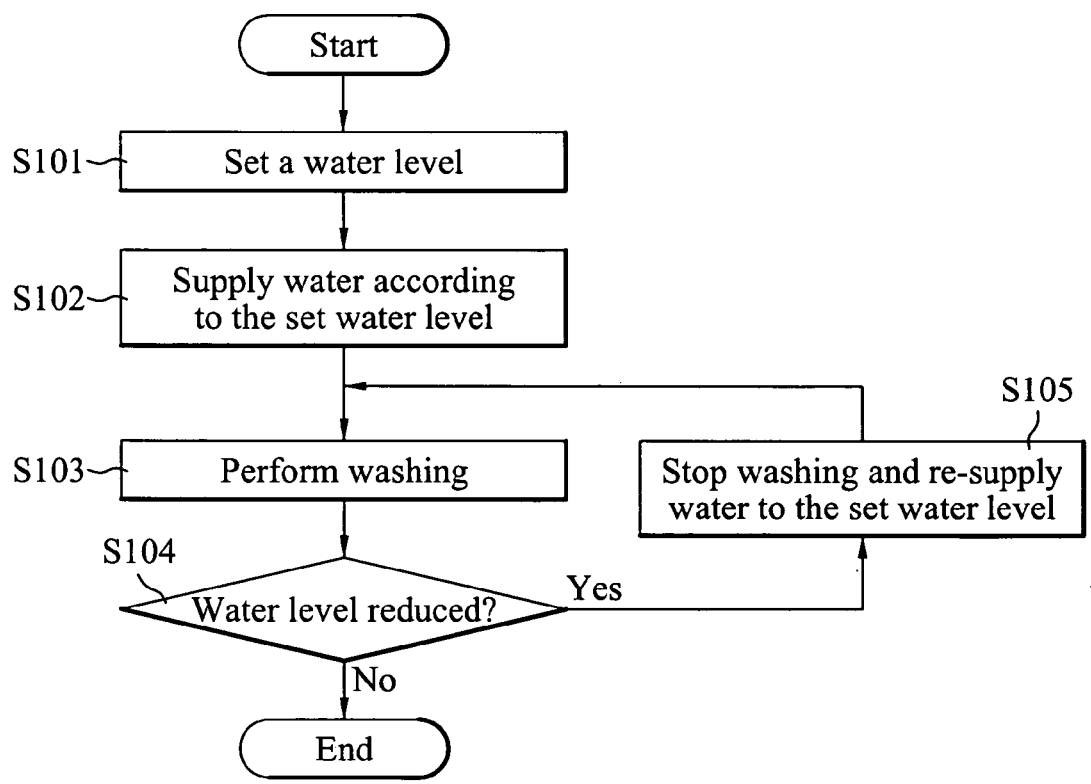
FIG. 1 is a flowchart of a washing machine control method according to a related art.
Figure 2:
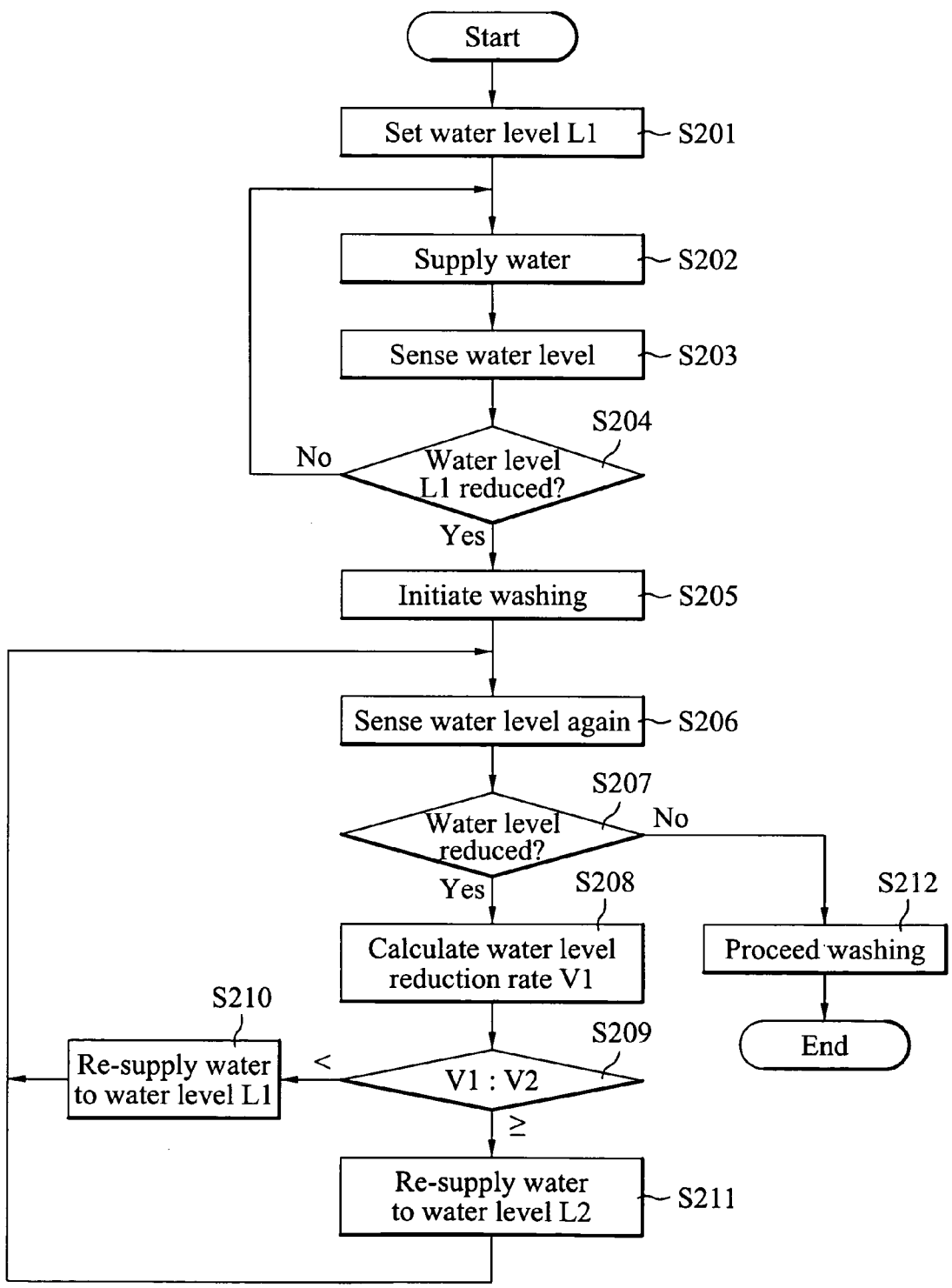
FIG. 2 is a flowchart of a washing machine control method according to the present invention.

Referring to FIG. 2, illustrating a washing machine control method according to the present invention, a water level L1 is set (S201) based on an amount and type of laundry placed in the washing machine and a wash course selected by a user. Water is supplied to the washing machine according to the set level (S202, S203, S204). In doing so, the water level is sensed by a water level sensor outputting a sensed water level signal to a microcomputer of the washing machine. Upon reaching the water level L1, the water supply is stopped so that washing may be initiated (S205).

As washing proceeds for a time, the water level is sensed again to determine whether the water has been reduced by a predetermined amount that precludes a continuation of the washing step (S206, S207). In doing so, the microcomputer compares a value corresponding to the sensed water level signal to a value stored in a lookup table. If a difference in the compared values indicates no significant reduction in the water level, the sensed water level is deemed appropriate, and washing proceeds (S212).

On the other hand, if the comparison indicates a significant reduction in the water level, a water level reduction rate V1 is calculated (S208) by comparing the water levels of the steps S203 and S206 over time. The water level reduction rate V1 is then compared (S209) to a predetermined rate V2 to determine an optimum water re-supply amount. That is, if the value of V1 is less than the value of V2, water is re-supplied to the washing machine according to the water level L1 (S210); and if the value of V1 is greater than or equal to the value of V2, water is re-supplied to the washing machine according to a water level L2 (S211), which is a higher level than the water level L1 to compensate for a faster rate of water absorption or evaporation. Here, the water level L2 is determined based on a set values stored in the lookup of the microcomputer, and the predetermined rate V2 is a reference value based on a number of water re-supply operations that would negatively affect the wash course during a prescribed time between initiating the water supply and a completion of the water supply as determined by the step S207.

The washing machine control method according to the present invention calculates in the steps S206-S208 the water level reduction rate for each instance of re-supplying water per the steps S209-S211, so that the optimum water re-supply amount can be quickly determined, thus preventing an excessive repetition of water re-supply operations. That is, the method of the present invention calculates a plurality of water level reduction rates $V1_1$ to $V1_n$ so that an average water level reduction rate may be obtained, where n is the number of water re-supply operations and is preferably three or four. Thus, the wash pattern of the selected wash course may be optimized, i.e., reset, based on the average water level reduction rate, so that wash performance is improved.

It will be apparent to those skilled in the art that various modifications and variations can be made in the present invention without departing from the spirit or scope of the invention. Thus, it is intended that the present invention cover such modifications and variations, provided they come within the scope of the appended claims and their equivalents.

What is claimed is:

1. A washing machine control method comprising steps of:
   proceeding with a user-selected wash course after supplying water to a washing machine according to a first water level set based on an amount of laundry in the washing machine;
   sensing a second water level at a predetermined time during the wash course;
   calculating a water level reduction rate based on the set first water level and the sensed second water level;
   determining a water re-supply amount by comparing the calculated water level reduction rate to a predetermined value; and
   completing the user-selected wash course after re-supplying water to the washing machine according to the water re-supply amount.

2. The method as claimed in claim 1, wherein the water is re-supplied according to the first water level, if the calculated water level reduction rate is less than the predetermined value.

3. The method as claimed in claim 1, wherein the water is re-supplied according to a third water level if the calculated water level reduction rate is greater than or equal to the predetermined value.

4. The method as claimed in claim 1, wherein said sensing and calculating steps are each repeated, to obtain an average rate of water level reduction, and wherein the user-selected wash course is reset based on the average rate of water level reduction.

5. The method as claimed in claim 4, wherein the said sensing and calculating steps are each repeated three times.

6. The method as claimed in claim 4, wherein the said sensing and calculating steps are each repeated four times.

7. The method as claimed in claim 1, wherein the first and second water levels are sensed by sensing a variation of a water pressure of the water in the washing machine.

8. The method as claimed in claim 3, wherein the third water level is greater than the first water level.

9. A washing machine control method comprising:
   supplying water to a washing machine according to a first water level based on an amount of laundry in the washing machine;
   performing a wash cycle for a predetermined time;
   sensing a second water level after the predetermined time;
   calculating a water level reduction rate by comparing the first water level and the second water level over time;
   determining a water re-supply amount by comparing the calculated water level reduction rate to a predetermined value; and
   completing the wash cycle after re-supplying water to the washing machine based on the water re-supply amount.

* * * * *